Patented Apr. 28, 1936

2,038,586

UNITED STATES PATENT OFFICE 2,038,586

COMPOSITION FOR TREATMENT OF ANEMIA AND METHOD OF PREPARING SAME

Arthur E. Meyer, Rockford, Ill., assignor to Chappel Bros., Inc., Rockford, Ill., a corporation of Illinois No Drawing. Application December 21, 1931, Serial No. 582,503

18 Claims. (Cl. 167—55)

This invention relates to a composition of matter useful in the treatment of anemia and to a method for producing the same.

In anemic conditions, when the hemoglobin content of the blood is low, the supply of iron is a very important factor in the treatment for blood regeneration and its effectiveness varies considerably with the form in which it is administered either alone or according to the well known liver and iron therapy under the teachings of Whipple, Minot and Murphy, and others, wherein liver extract and some form of iron are administered to the patient concurrently, either separately or mixed. A principal difficulty in supplying this lies in the fact that under the conditions existing in the digestive system ordinary iron compounds are not readily absorbed. It is believed that in order to be absorbed the iron must exist as either a soluble compound or as a relatively stable colloid of very small particle size. However, when iron is taken internally, as salts of either inorganic or organic acids they pass, during the digestive process, from the stomach, which is acid in reaction, into the intestine, which is alkaline in reaction, whereupon the insoluble hydroxide of iron is formed, in which condition the iron cannot be absorbed. Doubtless, a small amount of iron is absorbed during this process but not in sufficient quantity to effect the desired results. Furthermore, a large excess of iron salts must be given, most of which passes through the intestine without benefit to the patient. Many times gastric disturbances caused by the use of these compounds did more harm to the patients than the benefits to be expected from the treatment.

Hemoglobin prepared from animals' blood has been used for the purpose of supplying the iron in the so-called organic form. This has generally been considered beneficial but its effect has been small, due principally to the low iron content of the material.

The present invention aims to provide a composition from which the iron is much more readily absorbed, which gives a better therapeutic effect, which is less irritating in its effect, and which has a less objectionable taste, and to provide a method for preparing the composition.

In preparing the composition I prefer to proceed substantially as follows: Dissolve 50 grams of dry ferrous chloride or 80 grams of crystallized ferrous chloride ($FeCl_2.4H_2O$) in sufficient water to make 100 cc. of solution. The exact volume of solution is not important except that the solution should be concentrated. By keeping the solution of ferrous chloride in water very strong the degree of dissociation is small and the rate of hydrolysis is maintained at as low a point as possible. Furthermore, it permits a more concentrated ultimate product to be formed. Ferrous sulfate, ferrous ammonium sulfate and other soluble ferrous salts may be used instead of ferrous chloride or in addition thereto, but I have found them to be less desirable because of their lower solubility and their greater tendency to hydrolize producing a less stable product. This solution should be filtered into about 650 cc. of glycerine in order to remove insoluble matter such as oxychlorides and ferric oxide.

The mixture should then be stirred and the hydrogen ion concentration adjusted by adding thereto with constant stirring a 10% solution of caustic alkali. This may be sodium hydroxide, potassium hydroxide, ammonium hydroxide or other non-poisonous hydroxide which does not yield an insoluble compound with the iron solution. When ammonium hydroxide is used the concentration may be slightly greater than that equivalent to 10% sodium hydroxide because of the difference in strength. By a 10% solution I mean one wherein 100 cc. of the solution contains 10 grams of the alkali. It is not essential that exactly a 10% solution of alkali be used but I have found it convenient to employ one of about this concentration for practical reasons. When the concentration of the alkali is too great there is a tendency for ferrous hydroxide to be precipitated upon the addition of the alkali because of the difficulty of mixing the alkali into the iron solution with sufficient rapidity. On the other hand, it is desirable to employ an alkali of as great a strength as is conveniently possible in order to avoid adding too much water. It is desirable that the water content of the mixture of ferrous chloride solution and glycerine be maintained at as low a point as is practically possible since the more water contained in the glycerine the shorter the range in which the pH remains at 6.8. In other words, the buffer range of the glycerine is shortened as the percentage of water increases. For these reasons I have found about a 10% solution of alkali to be the most convenient for the purpose.

The hydrogen ion concentration of the ferrous chloride and glycerine solution should be adjusted to about 6.8 on the pH scale by the indicator method using bromthymol blue as an indicator without diluting the solution. Preparing the solution as above described the following gives an indication of the change of hydrogen ion concentration with the addition of 10% sodium hydroxide. The original ferrous chloride and glycerine solution has a pH of less than 3.8. The additions of alkali and the resulting pH are shown in the following table—

| Alkali added (cubic centimeter) | pH |
|---|---|
| 8 | 6.4 |
| 10 | 6.6 |
| 13 | 6.7 |
| 15 | 6.8 |
| 18 | 6.8 |
| 21 | 6.8 |
| 26 | 6.8 |
| 31 | 7.0 |
| 36 | 7.0 | the indicators being bromcresol green, bromcresol purple and bromthymol blue, the tests being made without diluting the ferrous chloride and glycerine solution. It will be seen that the pH reaches 6.8 upon the addition of 15 cc. of the 10% alkali and remains at 6.8 until more than 26 cc. of alkali has been added. However, as previously stated, the greater the amount of water contained in the ferrous chloride and glycerine the shorter will be this range in which the pH remains at 6.8. Solutions having a pH of 7 or more are unstable and solids will precipitate therefrom in a day or so. Mixtures having a pH of 6.8 are of an emerald green color and are stable over a long period of time if not exposed to the air. Upon dilution with water, however, a precipitate is usually formed the quantity of which depends upon the amount of alkali present. It is desirable to avoid weak solutions in order to be able to administer the desired amount of iron in the smallest volume. However, where more dilute compositions are required it is advisable that more than about ¼ of the total liquid should consist of the solution of $FeCl_2$ in water, if a wide buffer range is to be maintained and the material be capable of dilution with protective colloids without precipitation. In other words, under these circumstances the mixture of ferrous chloride water and glycerine should contain not less than about 75% glycerine if it is to be reasonably stable.

I have found that a more effective composition, and one which is more stable, is formed if a reagent belonging to the group known as protective colloids is added to the above solution. I can give no theoretical reason for this unless it be that the iron exists in the solution in the colloidal state and that the colloid is stabilized by the presence of the protective colloid which prevents precipitation of the iron upon standing and also acts to prevent the precipitation of the iron when the composition passes from the stomach into the intestine whereby a greater percentage of the iron is absorbed. It is also quite probable that the protective colloid also exhibits a buffer action. I have found blood serum to be particularly suited for this purpose and it may be advantageously used as defibrinated or citrated blood, or blood which has otherwise been prevented from clotting, the latter being particularly desirable since it combines with the inorganic iron mixture, the organic iron of the hemoglobin. The blood serum not only acts as a protective colloid but serves as well to materially retard the rate of oxidation of iron to the ferric state. When a solution having a pH 6.8 formed with 20 cc. of NaOH, as explained, is diluted with twice its volume of water, a dark green precipitate is formed immediately. If it is diluted with serum in the same or any other proportion, the color change is about as one can expect from the mixture of a yellow serum with a weak green solution. No noticeable precipitation occurs.

Other colloids prevent the formation of a precipitate also, though to a less degree. The following colloids have been used: egg white, gelatin, starch, tragacanth gum, acacia gum. In each, the color quickly changes after dilution to a deep green which turns more or less opaque on standing. It is possible that the degree of effect of the other colloids in keeping the ferrous hydroxide in the dispersed state depends on the dispersity of the protective colloid itself. Tragacanth, for instance, which does not form a very dispersed solution but which looks more like the suspension of a gel in water, is of low protective effect. The solution soon becomes turbid and is ready to let down a precipitate. A 2% solution of gelatin is far better, the composition remains transparent in a thin layer but is of a dark green color. The other colloids used range between gelatin and tragacanth in effectiveness. Their effectiveness appears to depend largely on the concentration of the colloid and on its preparation, the latter of which has an important influence on the degree of dispersion. It appears that blood serum, a colloid prepared by nature itself, is superior to artificially made colloidal solutions.

The effect of the compositions on anemic dogs was recorded. Dogs of the same litter, the blood of each having a hemoglobin content of 35%, Newcomer, were kept on an iron poor diet and the time required for their recovery to a normal hemoglobin content of 70% was noted. The control dog which was given no treatment aside from the iron poor diet, required 28 days for recovery. A dog treated with a solution of ferrous chloride in glycerine in which the pH was not adjusted the dosage being the equivalent of 0.10 gram of iron per day required 14 days. The dog treated at the rate of the equivalent of 0.10 gram of iron per day with the solution of ferrous chloride in glycerine in which the pH was adjusted as above described required only 8 days for recovery. Another dog of the same litter with the same deficiency of hemoglobin when treated with defibrinated blood alone required 11 days for complete recovery. A second series of tests were run in order to make a comparison between the value of defibrinated blood alone and defibrinated blood containing the neutralized solution of ferrous chloride in glycerine. In these tests the dogs all had a predetermined deficiency of hemoglobin and the control dog required 21 days for complete recovery. A dog treated with the neutralized solution of iron in glycerine required 14 days and the dog treated with the mixture of blood and the neutralized solution of iron in glycerine required 12 days. These tests show a considerable superiority for the mixture of blood and the neutralized solution of iron in glycerine. The results of clinical tests in the treatment of anemia in human beings further substantiate the results of the above mentioned tests.

While I have given various theories to explain the benefits and advantages of my composition and certain words of description based on such theories, such theories are given only by way of description and illustration and I do not wish to be limited to any particular theory or method of operation, and I am aware that numerous alterations and changes may be made in the composition and methods disclosed within the spirit of the invention and the scope of the appended claims in which

I claim:

1. A composition for the treatment of anemia comprising a neutralized solution of a highly soluble, non-poisonous ferrous salt in water containing sufficient glycerine to normally prevent precipitation of the iron.

2. A composition for the treatment of anemia comprising a neutralized solution of ferrous chloride in water containing sufficient glycerine to normally prevent precipitation of the iron.

3. A composition for the treatment of anemia comprising a neutralized solution of a highly soluble, non-poisonous ferrous salt in water containing sufficient glycerine to normally prevent precipitation of the iron to which solution has been added a protective colloid.

4. A composition for the treatment of anemia comprising a neutralized solution of ferrous chloride in water containing sufficient glycerine to normally prevent precipitation of the iron to which solution has been added a protective colloid.

5. A composition for the treatment of anemia comprising a neutralized solution of a highly soluble, non-poisonous ferrous salt in water containing sufficient glycerine to normally prevent precipitation of the iron to which solution has been added a protective colloid consisting of blood serum.

6. A composition for the treatment of anemia comprising a neutralized solution of ferrous chloride in water containing sufficient glycerine to normally prevent precipitation of the iron to which solution has been added a protective colloid consisting of blood serum.

7. A composition for the treatment of anemia comprising a neutralized solution of ferrous chloride in water containing sufficient glycerine to normally prevent precipitation of the iron to which solution has been added a protective colloid consisting of defibrinated blood.

8. A composition for the treatment of anemia comprising a neutralized solution of ferrous chloride in a mixture of water and glycerine containing at least about 75% of glycerine.

9. A composition for the treatment of anemia comprising a neutralized solution of ferrous chloride in a mixture of water and glycerine to which blood serum has been added, said mixture containing at least 75% of glycerine.

10. A composition for the treatment of anemia comprising a neutralized solution of ferrous chloride in water and glycerine in the proportions of at least 40 grams of ferrous chloride to 100 cc. of water and at least 300 cc. of glycerine.

11. A composition as set forth in claim 10 containing blood serum.

12. A method of preparing a composition for the treatment of anemia comprising preparing a concentrated solution of a highly soluble, non-poisonous ferrous salt in water, mixing therewith sufficient glycerine to normally prevent precipitation of the iron when neutralized, and neutralizing said mixture.

13. A method of preparing a composition for the treatment of anemia comprising preparing a concentrated solution of ferrous chloride in water, mixing therewith sufficient glycerine to normally prevent precipitation of the iron when neutralized, and neutralizing said mixture.

14. A method of preparing a composition for the treatment of anemia comprising preparing a concentrated solution of ferrous chloride in water, mixing therewith sufficient glycerine to normally prevent precipitation of the iron when neutralized, neutralizing said mixture, and adding a protective colloid.

15. A method of preparing a composition for the treatment of anemia comprising preparing a concentrated solution of ferrous chloride in water, mixing therewith sufficient glycerine to normally prevent precipitation of the iron when neutralized, neutralizing said mixture, and adding a protective colloid consisting of blood serum.

16. A method of preparing a composition for the treatment of anemia comprising preparing a concentrated solution of ferrous chloride in water, mixing therewith sufficient glycerine to normally prevent precipitation of the iron when neutralized, neutralizing said mixture, and adding a protective colloid consisting of defibrinated blood.

17. A method of preparing a composition for the treatment of anemia comprising preparing a concentrated solution of ferrous chloride in water, mixing therewith sufficient glycerine to normally prevent the precipitation of the iron when neutralized, and neutralizing said mixture by adding thereto a solution of a reagent taken from the group sodium hydroxide, and potassium hydroxide.

18. A composition for the treatment of anemia comprising a substantially neutral solution of ferrous chloride and a hydroxide taken from the group sodium hydroxide and potassium hydroxide in water containing sufficient glycerine to normally prevent precipitation of the iron.

ARTHUR E. MEYER.